(No Model.)
W. M. MOUNTAIN.
HAY ELEVATOR.
No. 268,813. Patented Dec. 12, 1882.
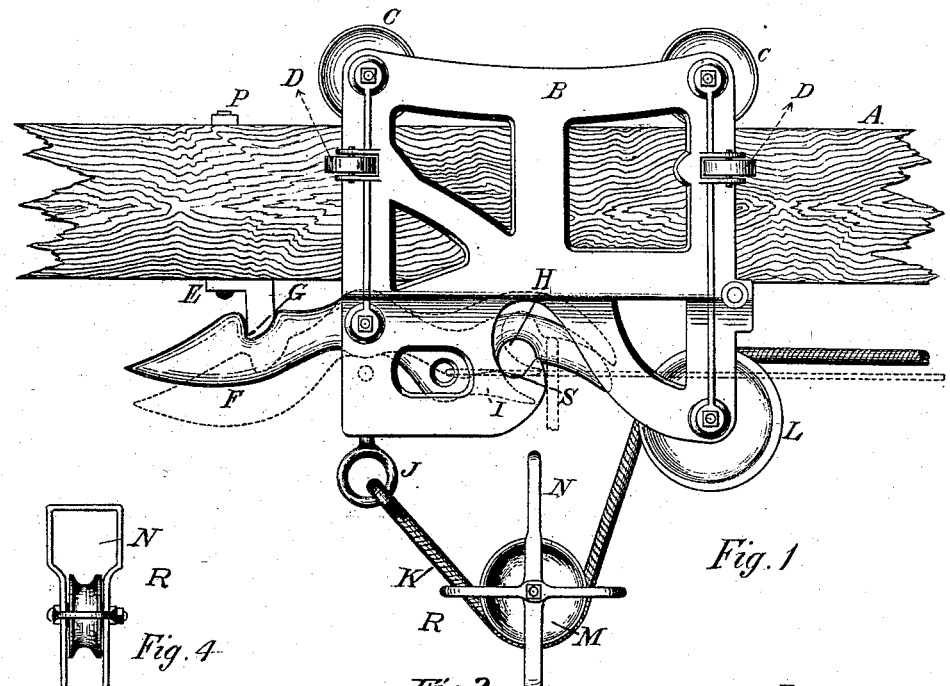
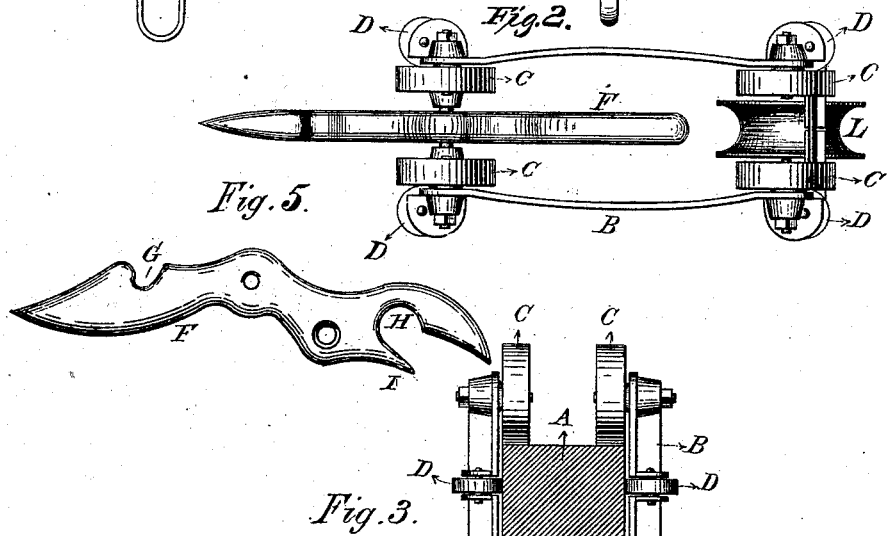
Witnesses:
John H. Sponseller
Fred. W. Bond
Inventor:
W. M. Mountain
Fowler & Bond, Attys.

UNITED STATES PATENT OFFICE.

WILLIAM M. MOUNTAIN, OF CANTON, OHIO.

HAY-ELEVATOR.

SPECIFICATION forming part of Letters Patent No. 268,813, dated December 12, 1882.

Application filed October 14, 1882. (No model.)

*To all whom it may concern:*

Be it known that I, WM. M. MOUNTAIN, a citizen of the United States, residing at Canton, in the county of Stark and State of Ohio, have invented certain new and useful Improvements in Hay-Elevators; and I do hereby declare that the following is a full, clear, and exact description of the same, reference being had to the annexed drawings, making a part of this specification, and to the letters and figures of reference marked thereon, in which—

Figure 1 is a side elevation. Fig. 2 is a top view. Fig. 3 is a transverse sectional view; Fig. 4, a detail of the elevating-head or load-carrier. Fig. 5 is a detail view of the pivoted lever.

The present invention has relation to that class of hay-elevators in which the load is elevated by means of a head or block suspended from a carriage and operated by a rope and pulleys, said carriage traveling back and forth on an elevated track to carry the load to the place of deposit.

The object of the invention is to improve the construction of the above class of hay-elevators, whereby the control of the carriage and elevating and depositing the load are more effective and certain, and in which the elevating-head and carriage are respectively released and locked simultaneously when the carriage is returned after the load has been deposited, both operations being performed automatically in a much more simple and effective manner than heretofore. This object I attain by the construction substantially as shown in the drawings, and hereinafter described and claimed.

In the drawings, A represents the track; B, the carriage or frame; C, the traveling-wheels; D, the protecting-wheels; E, the stop on the track A; F, the lever or arm; G, the notch or recess in the arm F; H, the inward notch or recess in the lever or arm F; I, the projection on the under side of the lever or arm F; J, the swivel on the carriage or frame B; K, the operating-rope; L, the rope-pulley on the carriage or frame B; M, the rope-pulley on the elevating-head R; N, the slotted point or bail on the elevating-head R; O, the supports for the lever or arm F; P, the bolt for attaching the stop E to the track A; R, the elevating-head; S, the notches in the frame B.

The track A may be made of wood or any other suitable material, and is supported at the required height by posts, standards, or other suitable frame-work in the same manner as other tracks for elevators of this description.

The frame B may be made of cast-iron or any other suitable material, and is of the form shown in Figs. 1, 2, and 3. This frame is suspended from the track A by the wheels C, which travel on the track A, and are bolted or pivoted in the upper corners of the frame.

The lever or arm F is pivoted or bolted to the forward vertical pieces of the carriage or frame B, and projects some distance forward and extends back between the sides of the carriage or frame beyond the center piece, as shown in Fig. 1. The forward end of this lever or arm F is arranged to engage with the stop E, located on the under side of the track A at the end or place where the load is to be elevated. This stop E is attached to the under side of the track A by a bolt or in any other suitable manner, so that it can be adjusted and held in position to engage with and operate the lever or arm F.

The operating-rope K is attached at one end to the swivel J. This rope K passes from the swivel under the pulley M; thence over the pulley L on the frame or carriage to the devices by which it is operated in the ordinary manner.

The elevating-head R is suspended from the rope K by the pulley M, and may be cast or otherwise formed so as to have an opening for the pulley M and the passage of the rope K. To the lower side or end of this elevating-head R is a bail or projection for attaching the fork or load to the head, and extending up centrally from the body of this elevating-head is a bail which strikes the beveled portion of the frame or carriage passing said beveled portion, striking the under side of the lever or arm F, and at the same time raising the inner end and depressing the outward end of said lever or arm. As the bail raises the inner end of this lever or arm F the bail passes into the recess in the inner end of the arm or lever F, and lodges in the hooks or notches S in the frame B. The side pieces of the frame or carriage B are bent or curved, the concave sides facing inward, so that a bent or curved track can be used, as shown in a separate application. The corner vertical pieces of the frame B are each provided with a smooth-faced wheel. Said wheels are placed in such a position so that they will strike or bear against the track A at or near its center, and are for the purpose of protecting the track A as the carriage or frame B travels back and forth on said track, and to prevent friction and bring ends of track in line.

In operation the carriage or frame B is locked by the engagement of the notch G and stop E when the load is to be elevated. The load or fork is attached to the lower portion of the elevating-head R in any suitable manner, and is elevated by means of the head R through the medium of the rope K. As the head is elevated the bail will strike the under side of the lever or arm F and raise that end of the lever, at the same time depressing the forward end of said lever or arm so as to disengage the notch G from the stop E. After the load is discharged the carriage is returned for the next load. As it approaches the stop end or portion of the track the jointed end of the lever or arm F will bear against the under side of the stop E, raising the inner end of the lever or arm F to a point so as to throw the bail H out of the notches S by means of the projection I.

I do not claim broadly the stop on the track A for locking and unlocking the lever of the carriage.

What I claim, and desire to secure by Letters Patent, is—

1. The frame B, having its two upper horizontal pieces bent or curved so that their concaved sides will face each other, substantially as and for the purpose specified.

2. The frame B, having its corner vertical pieces provided with the smooth-faced wheels D, in combination with the track A, substantially as and for the purpose set forth.

3. The combination, with the elevating-head R, having bail N, of the frame B, carrying pivoted lever F, said lever having notch or recess G to engage with the stop E upon the under side of the track, and the notch or recess H and projection I for operating in connection with the bail N, substantially as and for the purpose set forth.

4. The frame B, having its two upper horizontal pieces bent or curved so that their concave sides will face each other, as shown, and having connected thereto the wheels C and the horizontal wheels D to bear against the sides of the track, substantially as and for the purpose specified.

5. The frame B, constructed as described, and having connected thereto the wheels C D and the pivoted lever F, formed with notch G, projection I, and notch H, in combination with the track A, having connected to its under side the stop E, and the head R, having the bail N, substantially as and for the purpose specified.

In testimony that I claim the above I have hereunto subscribed my name in the presence of two witnesses.

W. M. MOUNTAIN.

Witnesses:
 JOHN H. SPONSELLER,
 FRED. W. BOND.